US009740415B2

United States Patent
Olson et al.

(10) Patent No.: US 9,740,415 B2
(45) Date of Patent: Aug. 22, 2017

(54) OBJECT-BASED STORAGE MANAGEMENT (71) Applicant: International Business Machines Corporation, Armonk, NY (US)

(72) Inventors: John T. Olson, Tucson, AZ (US); Erik Rueger, Ockenheim (DE); Lance W. Russell, Rosanky, TX (US); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/943,379

(22) Filed: Nov. 17, 2015

(65) Prior Publication Data

US 2017/0139615 A1 May 18, 2017

(51) Int. Cl.
*G06F 11/14* (2006.01)
*G06F 3/06* (2006.01)

(52) U.S. Cl.
CPC ............ *G06F 3/0619* (2013.01); *G06F 3/065* (2013.01); *G06F 3/0683* (2013.01); *G06F 11/1451* (2013.01); *G06F 11/1446* (2013.01); *G06F 11/1448* (2013.01)

(58) Field of Classification Search
CPC .................................................. G06F 11/1451
See application file for complete search history.

(56) References Cited

U.S. PATENT DOCUMENTS

| | | | |
|---|---|---|---|
| 7,529,784 B2 | 5/2009 | Kavuri et al. | |
| 8,055,613 B1 | 11/2011 | Mu et al. | |
| 8,645,460 B2 | 2/2014 | Feng et al. | |
| 2014/0108717 A1* | 4/2014 | Tian | G06F 3/0604 |
| | | | 711/108 |

OTHER PUBLICATIONS

"DELPHI: Object Oriented Programming", *TeachITza, Google bilder*, http://www.google.de/imgres?imgurl=http%3A%2F%2Fwww.teachitza.com%2Fdelphi%2Fobject.gif&imgrefurl=http%3A%2F%2Fwww.teachitza.com%2Fdelphi%2Foop.htm&h=248&w=439&tbnid=vhPoU1X6ZH1mxM%3A&zoom=1&docid=DmFJzH58f8RHFM&ei=hJA_VbOAOcfaaL-ugHg&tbm=isch&iact=rc&uact=3&dur=817&page=1&start=0&ndsp=25&ved=0CDkQrQMwCA, retrieved from the Internet Nov. 11, 2015, 4 pages.

Almeida, Allesandro et al., "Towards Autonomic Fault-Tolerant Multi-Agent Systems", The 2nd Latin American Autonomic Computing Symposium (LAACS'2007), Petropolis, Rio de Janeiro, Brazil, Sep. 2007, 6 pages.

(Continued)

*Primary Examiner* — Edward Dudek, Jr.
*Assistant Examiner* — Andrew Russell
(74) *Attorney, Agent, or Firm* — Francis Lammes; Stephen J. Walder, Jr.; Randall J. Bluestone (57) ABSTRACT

A mechanism is provided for object-based storage management. A detection is made of an event being performed on or by the object. A determination is made as to whether the event meets with one or more rules in a set of rules that identify a backup or replication needing to be performed. Responsive to determining that the event meets with one or more rules in the set of rules that identify the backup or replication needing to be performed, an indication is made in a backup/replication field in metadata of the object that the backup and/or replication of the object needs to be performed. The indication in the backup/replication field in the metadata of the object causes one or more portions of the object to be backed up and/or replicated.

17 Claims, 3 Drawing Sheets

(56) References Cited

OTHER PUBLICATIONS

Bora, Sebnem et al., "Replication Based on Role Concept for Multi-agent Systems", Springer Berlin Heidelberg, Engineering Societies in the Agents World X, Lecture Notes in Computer Science, vol. 5881, Nov. 2009, 16 pages.

Briot, Jean-Pierre et al., "Experience and Prospects for Various Control Strategies for Self-Replicating Multi-Agent Systems", ACM, Proceedings of the 2006 International Workshop on Self-Adaptation and Self-Managing Systems (SEAMS'06), Shanghai, China, May 21-22, 2006, 8 pages.

Sukesh, Marla, "Object Oriented Design Principles", Code Project, http://www.codeproject.com/Articles/567768/Object-Oriented-Design-Principles, Apr. 8, 2013, 18 pages.

* cited by examiner

OBJECT-BASED STORAGE MANAGEMENT

BACKGROUND

The present application relates generally to an improved data processing apparatus and method and more specifically to mechanisms for object-based storage management.

Object-oriented programming (OOP) is a programming paradigm based on the concept of "objects", which are data structures that contain data, in the form of fields, often known as attributes; and code, in the form of procedures, often known as methods. A distinguishing feature of objects is that an object's procedures access and often modify the data fields of the object with which they are associated. In OOP programming, computer programs are designed out of objects that interact with one another. There is significant diversity in object-oriented programming, but most popular languages are class-based, meaning that objects are instances of classes, which typically also determines their type.

OOP takes the view that what programmers care about are the objects that are to be manipulated rather than the logic required to manipulate them. The first step in OOP is to identify all the objects the programmer wants to manipulate and how the objects relate to each other, an exercise often known as data modeling. Once an object has been identified, the object is generalized as a class of objects that defines the kind of data the object contains and any logic sequences that can manipulate the object. Each distinct logic sequence is known as a method. Objects communicate with well-defined interfaces called messages.

The concepts and rules used in OOP provide many important benefits:
  The concept of a data class makes it possible to define subclasses of data objects that share some or all of the main class characteristics. Called inheritance, this property of OOP forces a more thorough data analysis, reduces development time, and ensures more accurate coding.
  Since a class defines only the data it needs to be concerned with, when an instance of that class (an object) is run, the code will not be able to accidentally access other program data. This characteristic of data hiding provides greater system security and avoids unintended data corruption.
  The definition of a class is reusable not only by the program for which it is initially created but also by other object-oriented programs (and, for this reason, can be more easily distributed for use in networks).
  The concept of data classes allows a programmer to create any new data type that is not already defined in the language itself.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for object-based storage management. The illustrative embodiment detects an event being performed on or by the object. The illustrative embodiment determines whether the event meets with one or more rules in a set of rules that identify a backup or replication needing to be performed. The illustrative embodiment indicates in a backup/replication field in metadata of the object that the backup and/or replication of the object needs to be performed in response to determining that the event meets with one or more rules in the set of rules that identify the backup or replication needing to be performed. In the illustrative embodiment the indication in the backup/replication field in the metadata of the object causes one or more portions of the object to be backed up and/or replicated.

Thus, the illustrative embodiment provides improvements of backup and replication techniques using object-oriented principles. While current solutions provide a centralized scan over all objects to detect changes and provide a separate centrally managed data copy/sync process, the illustrative embodiments decentralize this process so that each object manage itself as a possible candidate to be backup and/or replicated so as to self-initiate a data copy or sync process.

In the illustrative embodiment, the event is a trigger and the trigger is at least one of a predetermined time interval being met, predetermined portions of data associated with the object are modified, or predetermined portions of the metadata associated with the object are modified. In the illustrative embodiment, the determination of whether the event meets with one or more rules in the set of rules that identify a backup or replication needing to be performed is a comparison of the event to each rule in the set of rules and the comparison is performed either synchronously during execution of the object or asynchronously to the execution of the object so as not to block the execution being performed by the object. In the illustrative embodiment, the set of rules are at least one of a set of rules intended for the object, a set of rules intended for a class of objects, a global set of rules for all objects, or a set of rules for a folder in which the object is created. Thus, the illustrative embodiment provides that only certain modifications by or to the object cause the backup and/or replication.

In the illustrative embodiment, the indication in the backup/replication field in the metadata of the object that the backup and/or replication of the object needs to be performed is at least one of changing a single bit from one value to another value, changing a set of bits from a first value to a second value in order to indicate a backup as needing to be performed, changing the first value to a third value in order to indicate a replication as needing to be performed, or changing the first value to a fourth value in order to indicate a backup and replication as needing to be performed. Thus, the illustrative embodiment provides for indications of whether just a backup needs to be performed, just a replication needs to be performed, or both a backup and replication needs to be performed.

The illustrative embodiment indicates in a data/metadata backup/replication field of the metadata of the object at least one of only data associated with the object needs to be backed up and/or replicated, only a section of the data associated with the object needs to be backed up and/or replicated, only the metadata associated with the object needs to be backed up and/or replicated, or both the data and the metadata associated with the object needs to be backed up and/or replicated. In the illustrative embodiment, the indication in the backup/replication field in the metadata of the object that causes one or more portions of the object to be backed up and/or replicated is an indication of a backup, the backup is performed by a storage controller in the storage system, and the storage controller backs up the object to a backup storage in the storage system. In the illustrative embodiment, the indication in the backup/replication field in the metadata of the object that causes one or more portions of the object to be backed up and/or replicated is an indication of a replication, the replication backup is performed by a storage controller in the storage system and a storage controller in a replication storage system, and the storage controller in the storage system and the storage controller in the replication storage system replicates the object to a replication storage in the replication storage system. Thus, the illustrative embodiment provides for indications of what needs to be backed up and/or replicated that is easily recognizable by the storage system as well as where and how the backup and/or replication is performed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions, which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Much like object-oriented programming (OOP), object oriented technologies may be reflected to storage implementations like extensions of object storage techniques. Again, OOP uses objects or self-contained modules to solve problems, where the objects are modules created by a programmer, represent something that actually exists, reacts to actions or events, are grouped into classes, and have members called properties and methods. A property describes the object while a method is something that may be performed to an object.

The illustrative embodiment recognizes that OOP may be implemented as well within the data storage areas and thus, the illustrative embodiments provide mechanisms for object-based storage management. While existing systems describe server-based backup and/or replication as well as client-based backup and/or replication techniques, these backup and/or replication techniques are organized and orchestrated by a central integrated management module, either server or client based. While backups are used to address data loss and mishaps, mirroring and replication solutions are used to address incidents where a whole system (site) is lost. Stateless incremental backup and remote synch (rsync)-like replications use a scan phase to identify the candidates files and a synchronization phase to copy the incremental data. Incremental backup as well as incremental replication are required in order to deal with the ever growing amount of data organization to be managed and protected. That is, a full backup of hundreds of terabytes (TBs)/petabytes (PBs) takes too long and as such, incremental backup is the only feasible solution for many large data repositories.

Thus, the illustrative embodiment provides improvements of backup and replication techniques using object-oriented principles. More specifically, the improvement of backup and replication of storage data within a storage system, especially with regard to self-organized data backup and replication of each object. Backup is the process of making a secondary copy of data that can be restored to use if the primary copy becomes lost or unusable. Backups usually comprise a point-in-time copy of primary data taken on a repeated cycle. Replication is sometimes assumed equivalent to backup, but this is not the case. Replication can be either synchronous or asynchronous, meaning transfer of data to a remote copy is achieved either immediately or with a short time delay. Both backup and replication create a secondary copy of data identical to the primary copy, with synchronous solutions achieving this in real time. Thus, objects to be backed up and/or replicated may be, for example, files in a file based storage system, logical unit numbers (LUNs) in a block-based storage system, objects stored in an object storage system, or the like. While current solutions provide a centralized scan over all objects to detect changes and provide a separate centrally managed data copy/sync process, the illustrative embodiments decentralize this process so that each object manages itself as a possible candidate to be backup and/or replicated so as to self-initiate a data copy or sync process. Additionally, the objects to be backed up or synchronized may include additional definitions and mechanisms that may trigger the appropriate backup or synchronization.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
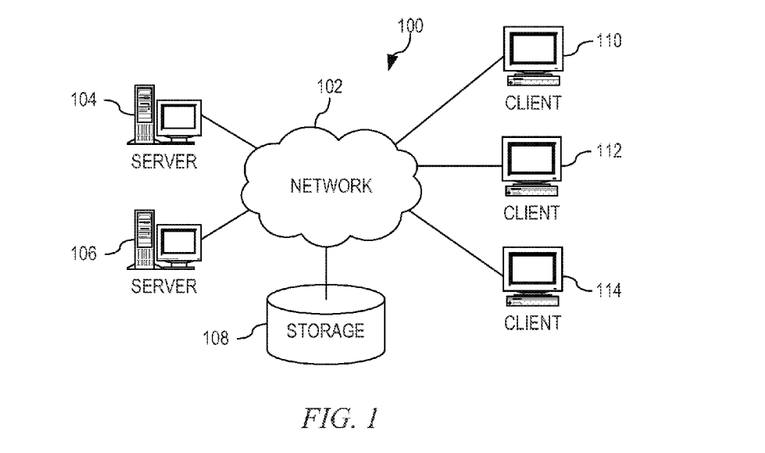
FIG. 1 is an example diagram of a distributed data processing system in which aspects of the illustrative embodiments may be implemented.
Figure 2:
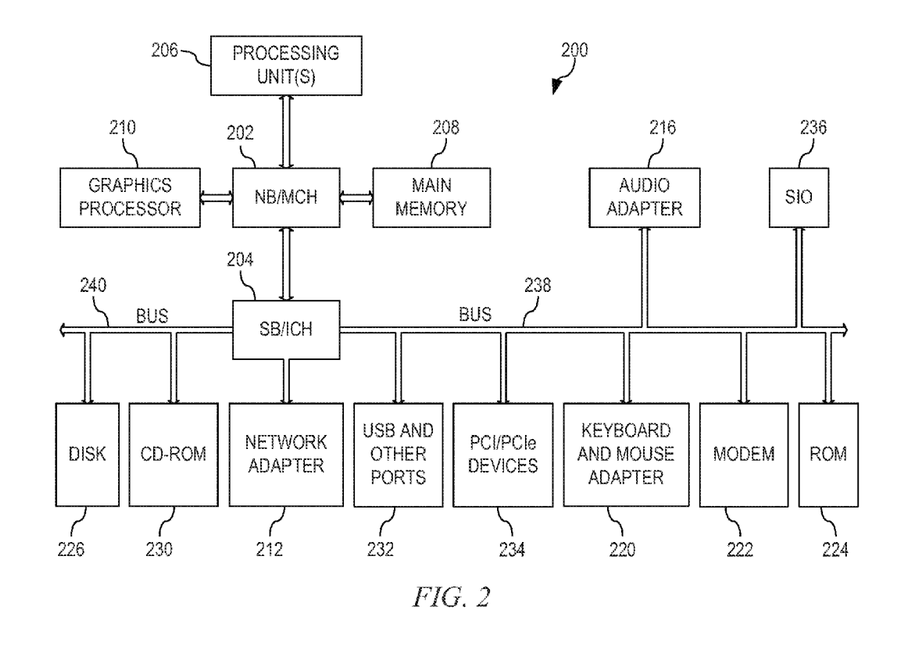
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an object-based storage management mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates object-based storage management.

As noted above, the mechanisms of the illustrative embodiments utilize specifically configured computing devices, or data processing systems, to perform the operations for object-based storage management. These computing devices, or data processing systems, may comprise various hardware elements that are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the object-based storage management.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
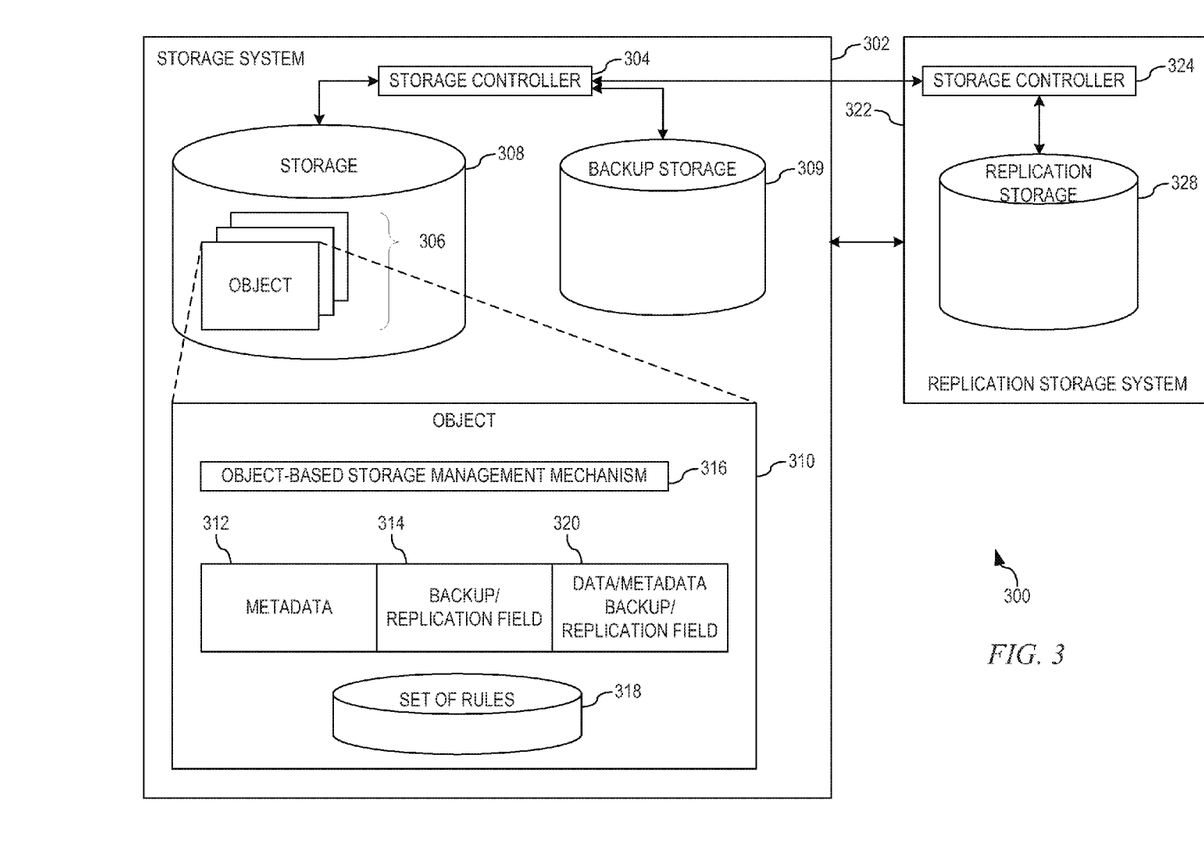
FIG. 3 depicts a functional block diagram of an object-based storage management mechanism in accordance with an illustrative embodiment.

FIG. 3 depicts a functional block diagram of an object-based storage management mechanism in accordance with an illustrative embodiment. Distributed data processing system 300, which is a data processing system such as data processing system 100 of FIG. 1, comprises storage system 302 and replication storage system 322, which are both data processing systems such as data processing system 200 of FIG. 2. Storage system 302 comprises storage controller 304 that manages a plurality of objects 306 within storage 308 as well as backing up one or more of the plurality of objects 306 to backup storage 309 and/or replication of one or more of the plurality of objects 306 to replication storage 328 in replication storage system 322 via storage controller 324. In accordance with the illustrative embodiments, each object 310 in the plurality of objects 306 is modified with an object-based storage management mechanism 316 that indicates when object 310 needs to be backed up and/or replicated. In order to indicate when a backup or replication is needed, each object 310 further comprises metadata 312 that is extended with a backup/replication field 314. Backup/replication field 314 is a field within metadata 312 that object-based storage management mechanism 316 populates, flags, or the like, when object-based storage management mechanism 316 identifies object 310 as needing to be backed up and/or replicated.

When object 310 executes, object-based storage management mechanism 316 associated with object 310 executes either synchronously during execution of object 310 or asynchronously to the execution of object 310 so as not to block the execution being performed by object 310 based upon an occurrence of an event trigger, such as a certain time interval, e.g. hourly, every four hours, twice daily, daily, or the like; when predetermined portions of data and/or metadata associated with object 310 are modified; or the like. Regardless of when object-based storage management mechanism 316 executes, object-based storage management mechanism 316 utilizes a set of rules 318 to determine whether the execution performed or being performed by object 310 qualifies as needing to be backed up or replicated.

The set of rules 318 are requirements of operations being performed to or being performed by object 310 that indicate when a backup and/or replication is needed, such as for example:
  The name of the object has changed;
  The object being written to such that the data and/or metadata associated with the object has changed, and/or
  The object should be backed up at a predetermined interval, for example, daily, weekly, monthly, or the like.

The set of rules 318 may be a combination of different sets of rules. That is, object-based storage management mechanism 316 may, at regular intervals, update the set of rules 318 from, for example, one or more of a set of rules intended for the specific object, a set of rules intended for a class of objects, a global set of rules for all objects, a set of rules for a folder in which the object is created, or the like. For example, data processing system 300 may have a system-wide default for the set of rules 318 set by a storage administrator and then applied to each newly created object. The set of rules 318 may then be changed later individually for each object. As another example, different classes of objects may each have a set of rules 318 based on different file types, metadata, or the like. During the creation of object 310, the set of rules 318 from the matching class will be applied to object 310. Changing the set of rules 318 for a class changes the set of rules 318 for all objects within the plurality of objects 306 where the particular class has been applied. As still another example, the set of rules 318 may be inherited based on an already existing hierarchy, such as, in a file system, creating object 310 inside a folder could inherit the set of rules 318 from the folder.

Therefore, object-based storage management mechanism 316 executes synchronously or asynchronously to determine whether the execution being performed to object 310 or by object 310 qualifies as needing to be backed up or replicated, such as when object 310 is written to, when object 310 is renamed, when a scheduled time interval, i.e. daily, weekly, monthly, or the like, has been met, or the like. Based on the set of rules 310, object-based storage management mechanism 316 flags backup/replication field 314 with an indication the backup or replication is needed. The flagging may be, for example, changing a single bit from one value to another value, changing a set of bits from a first value to a second value in order to indicate a backup as needing to be performed, the first value to a third value in order to indicate a replication as needing to be performed, or the first value to a fourth value in order to indicate a backup and replication as needing to be performed, or the like.

Additionally, object-based storage management mechanism 316 may specify which data within object 310 needs to be backed up and/or replicated. That is, since object-based storage management mechanism 316 may, for example, operate on a trigger event, such as when data and/or metadata in object 310 changes, then object-based storage management mechanism 316 may specify that only the data associated with object 310 needs to be backed up and/or replicated, only a section of the data associated with object 310 needs to be backed up and/or replicated, only the metadata associated with object 310 needs to be backed up and/or replicated, or both the data and the metadata associated with object 310 needs to be backed up and/or replicated. In order to identify the data and/or metadata, metadata 312 may again be extended with a data/metadata backup/replication field 320 that object-based storage management mechanism 316 updates to identify which data and/or metadata should be backed up and/or replicated when object-based storage management mechanism 316 indicates a backup and/or replication of object 310 when backup/replication field 314 is flagged based on one or more of the set of rules 318 being met.

In one embodiment, when object-based storage management mechanism 316 within object 310 flags backup/replication field 314, then object-based storage management mechanism 316 may either synchronously or asynchronously notify storage controller 304 of the required backup and/or replication. In another embodiment, when a backup and/or replication needs to be performed, storage controller 304 may query only backup/replication fields 314 associated with each of the plurality of objects 306 in order to identify a subject of objects of the plurality of objects 306 need to be backed up and/or replicated.

Upon identifying the subset of objects of the plurality of objects 306 that need to be back up and/or replicated, storage controller 304 initiates a backup and/or replication of the subset of objects to backup storage 309 and/or replication storage 328 in replication storage system 322 via storage controller 324. Thus, modifying each object 310 in the plurality of objects 306 with object-based storage management mechanism 316 provides a more efficient method and/or means to detect backup and/or replication of object candidates in order that only those objects with a flagged backup/replication field 314 are backup up and/or replicated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
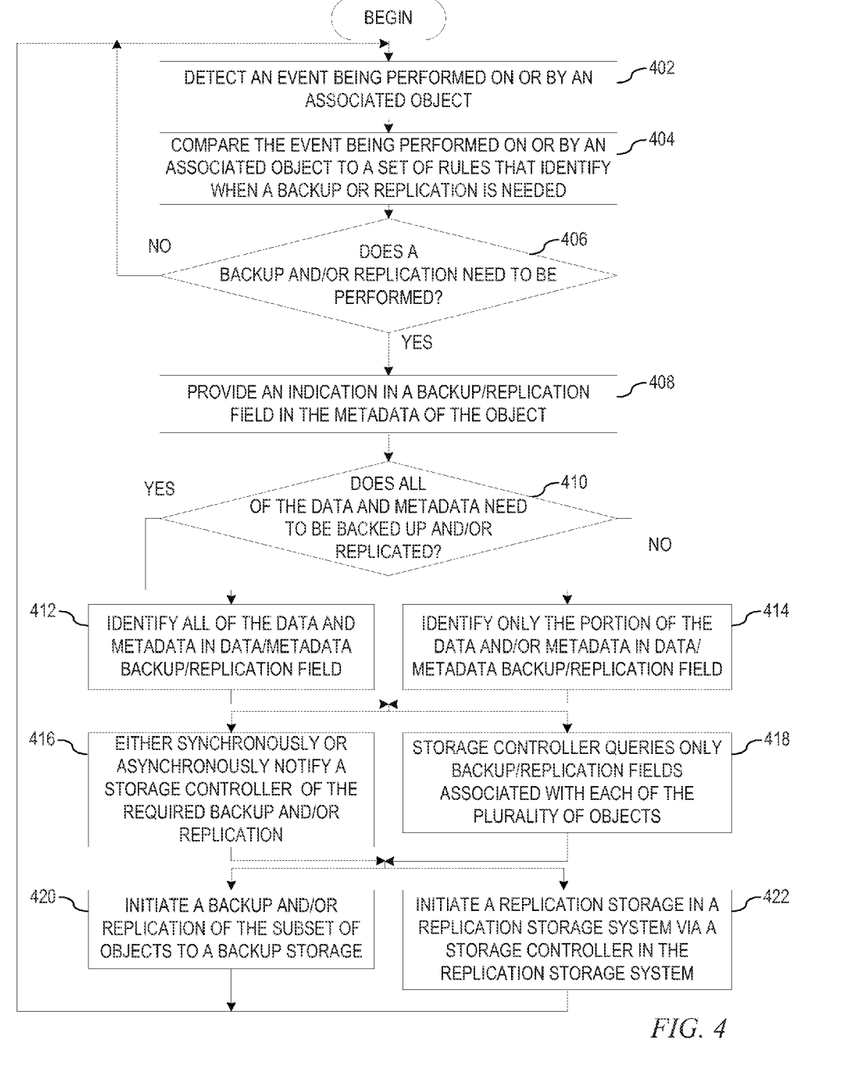
FIG. 4 depicts a flowchart of the operation performed in object-based storage management in accordance with an illustrative embodiment.

FIG. 4 depicts a flowchart of the operation performed in object-based storage management in accordance with an illustrative embodiment. As the operation begins, an object-based storage management mechanism detects an event being performed on or by an associated object (step 402). The event may be a trigger, such as a certain time interval, e.g. hourly, every four hours, twice daily, daily, or the like; when predetermined portions of data and/or metadata associated with the object are modified; or the like. The object-based storage management mechanism then compares the event being performed on or by an associated object to a set of rules that identify when a backup or replication is needed (step 404). The comparison may be performed either synchronously during execution of the object or asynchronously to the execution of the object so as not to block the execution being performed by the object.

For each event, the object-based storage management mechanism determines whether the event meets with one or more rules in the set of rules that identify a backup or replication needing to be performed (step 406). The set of rules are requirements of operations being performed to or being performed by the object that indicate when a backup and/or replication is needed, such as for example:

The name of the object has changed;
The object being written to such that the data and/or metadata associated with the object has changed; and/or
The object should be backed up at a predetermined interval, for example, daily, weekly, monthly, or the like.

The set of rules may be a combination of different sets of rules. That is, object-based storage management mechanism may, at regular intervals, update the set of rules from, for example, one or more of a set of rules intended for the specific object, a set of rules intended for a class of objects, a global set of rules for all objects, a set of rules for a folder in which the object is created, or the like.

If at step 406 the object-based storage management mechanism determines that the event fails to meet with one or more rules in the set of rules that identify a backup or replication needing to be performed, the operation returns to step 402. If at step 406 the object-based storage management mechanism determines that the event meets with one or more rules in the set of rules that identify a backup or replication needing to be performed, the object-based storage management mechanism provides an indication such as, populating, flagging, or the like, a backup/replication field in the metadata of the object (step 408). The populating, flagging, or the like may be, for example, changing a single bit from one value to another value, changing a set of bits from a first value to a second value in order to indicate a backup as needing to be performed, the first value to a third value in order to indicate a replication as needing to be performed, or the first value to a fourth value in order to indicate a backup and replication as needing to be performed, or the like.

The object-based storage management mechanism also determines whether all or only a portion of the data or metadata needs to be backed up and/or replicated (step 410). That is, the object-based storage management mechanism may specify that only the data associated with the object needs to be backed up and/or replicated, only a section of the data associated with the object needs to be backed up and/or replicated, only the metadata associated with the object needs to be backed up and/or replicated, or both the data and the metadata associated with the object needs to be backed up and/or replicated. If at step 410 the object-based storage management mechanism determines that all of the data and metadata needs to be backed up, then the object-based storage management mechanism either identifies all of the data and metadata in data/metadata backup/replication field of the metadata or leaves the data/metadata backup/replication field of the metadata vacant so as to indicate that all of the data and metadata needs to be backed up (step 412). If at step 410 the object-based storage management mechanism determines that just the data, only a portion of data, or just the metadata needs to be backed up and/or replicated, then object-based storage management mechanism identifies exactly what needs to be backed up and/or replicated in data/metadata backup/replication field (step 414).

From steps 412 or 414 the operation may be performed two different ways. At step 416 the object-based storage management mechanism either synchronously or asynchronously notifies a storage controller associated with the storage where the object is stored of the required backup and/or replication or at step 418, when a backup and/or replication needs to be performed, the storage controller queries only backup/replication fields associated with each of the plurality of objects in order to identify a subject of objects of the plurality of objects need to be backed up and/or replicated. Upon identifying the subset of objects of the plurality of objects that need to be back up and/or replicated, the storage controller initiates a backup and/or replication of the subset of objects to either a backup storage (step 420) and/or a replication storage in a replication storage system via a storage controller in the replication storage system (step 422), with the operation returning to step 402 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide improvements of backup and replication techniques using object-oriented principles. While current solutions provide a centralized scan over all objects to detect changes and provide a separate centrally managed data copy/sync process, the illustrative embodiments decentralize this process so that each object manages itself as a possible candidate to be backed up and/or replicated so as to self-initiate a data copy or sync process. Additionally, the objects to be backed up or synchronized may include additional definitions and mechanisms that may trigger the appropriate backup or synchronization.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a storage system, for object-based storage management, the method comprising:
   detecting, by an object-based storage management mechanism in an object in a storage of the storage system, an event being performed on or by the object;
   determining, by the object-based storage management mechanism, whether the event meets with one or more rules in a set of rules that identify a backup or replication needing to be performed;
   responsive to determining that the event meets with one or more rules in the set of rules that identify the backup or replication needing to be performed, indicating, by the object-based storage management mechanism, in a backup/replication field in metadata of the object that the backup and/or replication of the object needs to be performed, wherein the indication in the backup/replication field in the metadata of the object causes one or more portions of the object to be backed up and/or replicated; and
   indicating, by the object-based storage management mechanism, in a data/metadata backup/replication field of the metadata of the object at least one of only data associated with the object needs to be backed up and/or replicated, only a section of the data associated with the object needs to be backed up and/or replicated, only the metadata associated with the object needs to be backed up and/or replicated, or both the data and the metadata associated with the object needs to be backed up and/or replicated.

2. The method of claim 1, wherein the event is a trigger and wherein the trigger is at least one of a predetermined time interval being met, predetermined portions of data associated with the object are modified, or predetermined portions of the metadata associated with the object are modified.

3. The method of claim 1, wherein the determination of whether the event meets with one or more rules in the set of rules that identify a backup or replication needing to be performed is a comparison of the event to each rule in the set of rules and wherein the comparison is performed either synchronously during execution of the object or asynchronously to the execution of the object so as not to block the execution being performed by the object.

4. The method of claim 1, wherein the set of rules are at least one of a set of rules intended for the object, a set of rules intended for a class of objects, a global set of rules for all objects, or a set of rules for a folder in which the object is created.

5. The method of claim 1, wherein the indication in the backup/replication field in the metadata of the object that the backup and/or replication of the object needs to be performed is at least one of changing a single bit from one value to another value, changing a set of bits from a first value to a second value in order to indicate a backup as needing to be performed, changing the first value to a third value in order to indicate a replication as needing to be performed, or changing the first value to a fourth value in order to indicate a backup and replication as needing to be performed.

6. The method of claim 1, wherein the indication in the backup/replication field in the metadata of the object that causes one or more portions of the object to be backed up and/or replicated is an indication of a backup, wherein the backup is performed by a storage controller in the storage system, and wherein the storage controller backs up the object to a backup storage in the storage system.

7. The method of claim 1, wherein the indication in the backup/replication field in the metadata of the object that causes one or more portions of the object to be backed up and/or replicated is an indication of a replication, wherein the replication backup is performed by a storage controller in the storage system and a storage controller in a replication storage system, and wherein the storage controller in the storage system and the storage controller in the replication storage system replicates the object to a replication storage in the replication storage system.

8. A computer program product comprising a computer readable storage medium having a computer readable program stored therein, wherein the computer readable program, when executed on a computing device, causes the computing device to:
   detect an event being performed on or by the object;
   determine whether the event meets with one or more rules in a set of rules that identify a backup or replication needing to be performed;
   responsive to determining that the event meets with one or more rules in the set of rules that identify the backup or replication needing to be performed, indicate in a backup/replication field in metadata of the object that the backup and/or replication of the object needs to be performed, wherein the indication in the backup/replication field in the metadata of the object causes one or more portions of the object to be backed up and/or replicated; and
   indicate in a data/metadata backup/replication field of the metadata of the object at least one of only data associated with the object needs to be backed up and/or replicated, only a section of the data associated with the object needs to be backed up and/or replicated, only the metadata associated with the object needs to be backed up and/or replicated, or both the data and the metadata associated with the object needs to be backed up and/or replicated.

9. The computer program product of claim 8, wherein the event is a trigger and wherein the trigger is at least one of a predetermined time interval being met, predetermined portions of data associated with the object are modified, or predetermined portions of the metadata associated with the object are modified.

10. The computer program product of claim 8, wherein the determination of whether the event meets with one or more rules in the set of rules that identify a backup or replication needing to be performed is a comparison of the event to each rule in the set of rules and wherein the comparison is performed either synchronously during execution of the object or asynchronously to the execution of the object so as not to block the execution being performed by the object.

11. The computer program product of claim 8, wherein the set of rules are at least one of a set of rules intended for the object, a set of rules intended for a class of objects, a global set of rules for all objects, or a set of rules for a folder in which the object is created.

12. The computer program product of claim 8, wherein the indication in the backup/replication field in the metadata of the object that the backup and/or replication of the object needs to be performed is at least one of changing a single bit from one value to another value, changing a set of bits from a first value to a second value in order to indicate a backup as needing to be performed, changing the first value to a third value in order to indicate a replication as needing to be performed, or changing the first value to a fourth value in order to indicate a backup and replication as needing to be performed.

13. An apparatus comprising:
a processor; and
a memory coupled to the processor, wherein the memory comprises instructions which, when executed by the processor, cause the processor to:
detect an event being performed on or by the object;
determine whether the event meets with one or more rules in a set of rules that identify a backup or replication needing to be performed; and
responsive to determining that the event meets with one or more rules in the set of rules that identify the backup or replication needing to be performed, indicate in a backup/replication field in metadata of the object that the backup and/or replication of the object needs to be performed, wherein the indication in the backup/replication field in the metadata of the object causes one or more portions of the object to be backed up and/or replicated; and
indicate in a data/metadata backup/replication field of the metadata of the object at least one of only data associated with the object needs to be backed up and/or replicated, only a section of the data associated with the object needs to be backed up and/or replicated, only the metadata associated with the object needs to be backed up and/or replicated, or both the data and the metadata associated with the object needs to be backed up and/or replicated.

14. The apparatus of claim 13, wherein the event is a trigger and wherein the trigger is at least one of a predetermined time interval being met, predetermined portions of data associated with the object are modified, or predetermined portions of the metadata associated with the object are modified.

15. The apparatus of claim 13, wherein the determination of whether the event meets with one or more rules in the set of rules that identify a backup or replication needing to be performed is a comparison of the event to each rule in the set of rules and wherein the comparison is performed either synchronously during execution of the object or asynchronously to the execution of the object so as not to block the execution being performed by the object.

16. The apparatus of claim 13, wherein the set of rules are at least one of a set of rules intended for the object, a set of rules intended for a class of objects, a global set of rules for all objects, or a set of rules for a folder in which the object is created.

17. The apparatus of claim 13, wherein the indication in the backup/replication field in the metadata of the object that the backup and/or replication of the object needs to be performed is at least one of changing a single bit from one value to another value, changing a set of bits from a first value to a second value in order to indicate a backup as needing to be performed, changing the first value to a third value in order to indicate a replication as needing to be performed, or changing the first value to a fourth value in order to indicate a backup and replication as needing to be performed.

* * * * *